Feb. 6, 1951  R. F. ADKISSON  2,540,228
ADJUSTABLE DRAFT MECHANISM FOR IMPLEMENT FRAMES
Filed Feb. 28, 1947  3 Sheets-Sheet 3
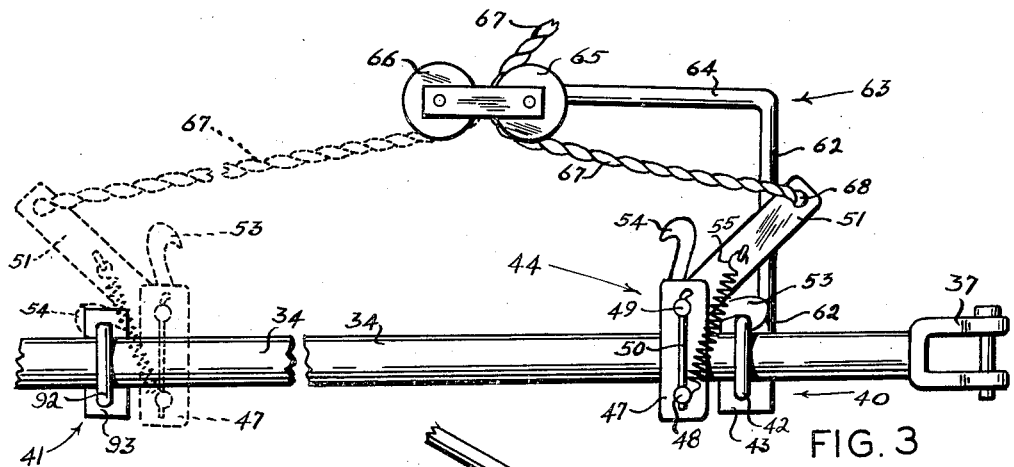
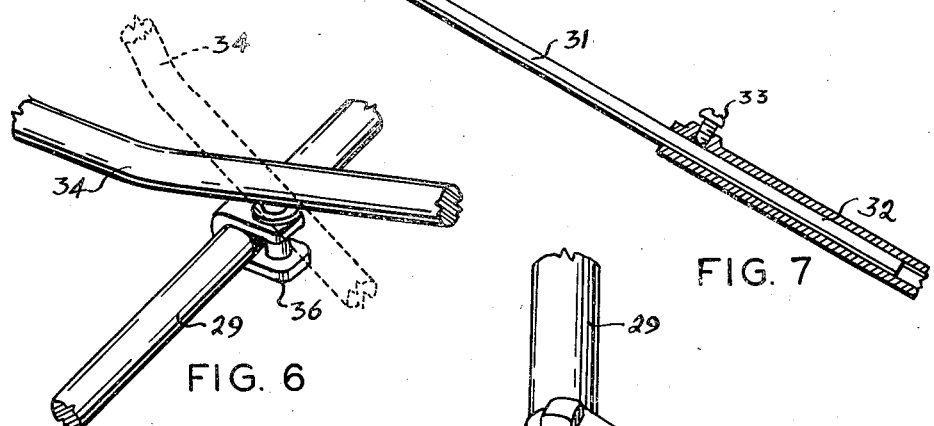
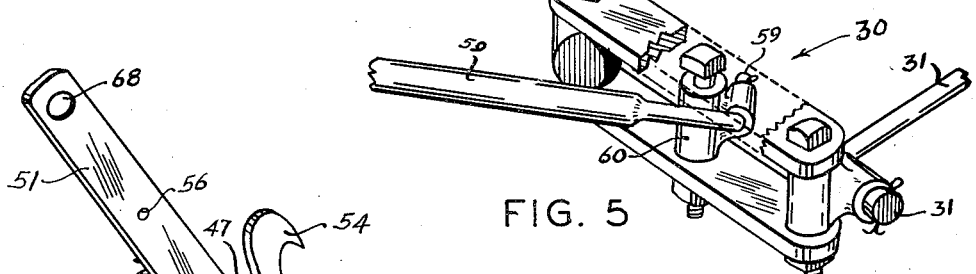
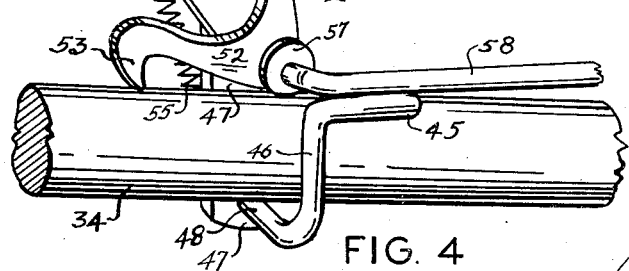
Robert Floyd Adkisson
INVENTOR.
BY
Bernard P. Miller
ATTORNEY Patented Feb. 6, 1951

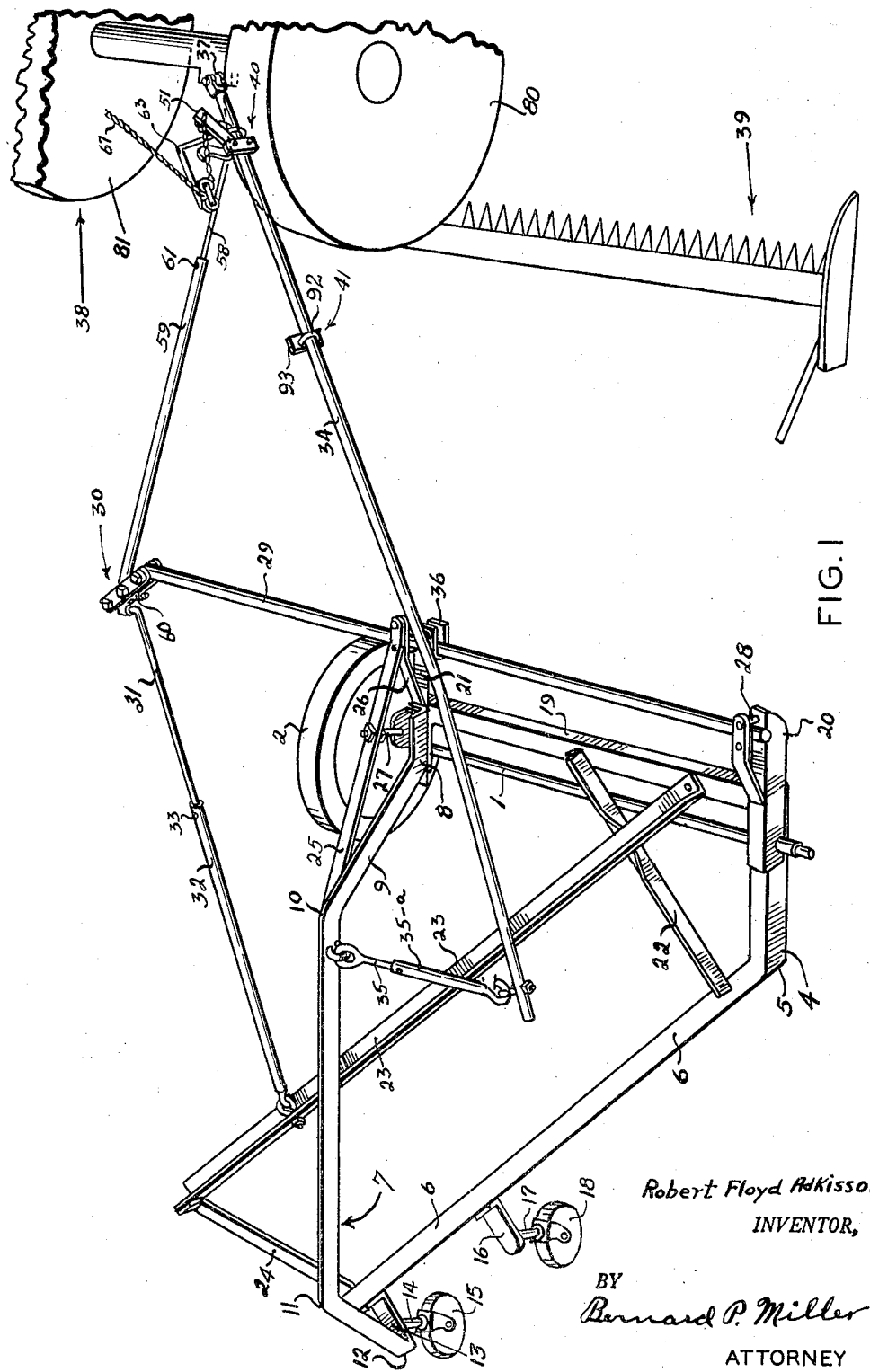

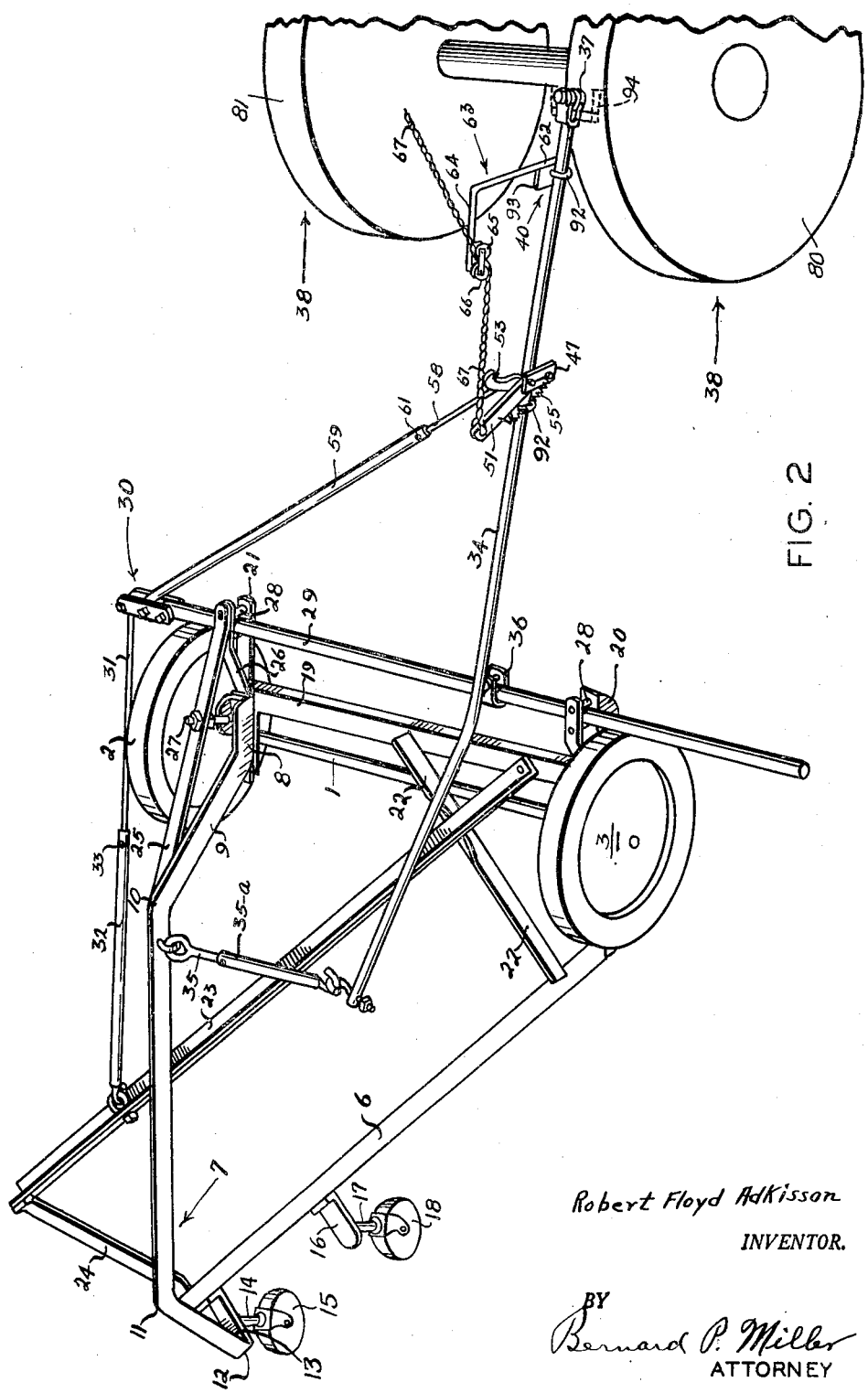

2,540,228

UNITED STATES PATENT OFFICE 2,540,228

ADJUSTABLE DRAFT MECHANISM FOR IMPLEMENT FRAMES

Robert Floyd Adkisson, Verden, Okla.

Application February 28, 1947, Serial No. 731,431

4 Claims. (Cl. 56—376)

My invention relates to adjustable draft mechanism for field rakes, and other earth or crop working vehicles, and more particularly to power drawn vehicles of this type.

The rake of the present invention is an improvement over the rake drafting mechanism disclosed in the United States patent numbered 2,240,168 which was issued to me on April 29, 1941, under the title of "Method of Cutting and Raking Farm Crops."

The prime object of the present invention is to provide a simplified and improved mechanism for accomplishing the rake drafting method disclosed and claimed in said patent.

Other objects will be apparent from the following description when taken in conjunction with the accompanying three sheets of drawings, wherein:

Figure 1 is a perspective view of a frame for supporting conventional hay raking equipment, not shown, said frame mechanism operatively attached to the rear of conventional mowing equipment, the nearest wheel of the frame being removed;

Figure 2 is a similar view showing the frame mechanism shifted laterally;

Figure 3 is an enlarged fragmentary elevational view of the draw-bar of the frame mechanism, and detailing a shifting mechanism carried thereby;

Figure 4 is an enlarged fragmentary elevational view of the draw-bar, detailing a latching mechanism carried thereby;

Figure 5 is an enlarged fragmentary perspective view detailing a portion of the rake hitching mechanism;

Figure 6 is an enlarged fragmentary perspective view detailing another portion of the hitching mechanism; and, Figure 7 is an enlarged fragmentary elevational view, partially in vertical section, of a telescoping rod which constitutes a part of the hitching mechanism.

Like characters of reference designate like parts in those figures of the drawings in which they occur.

Since the drafting mechanism of the present invention is particularly adaptable for the purpose of hitching field rakes behind a tractor or other power unit, its adaption to such a use is shown in the accompanying drawings and is described hereinbelow.

In the drawings:

The reference numeral 1 indicates a horizontal axle having a rotatably mounted wheel 2 on its left hand end, and having a similar wheel 3 on its right hand end. The wheels 2 and 3 are adapted to roll upon the ground and to support the axle 1 and also a rake frame.

The rake or implement frame consists of a metal side beam 4, the front portion of which extends horizontally at right angles to the axle 1, and through which the right hand end of the axle projects before receiving the wheel 3. The beam 4 extends rearwardly from the axle 1 beyond the rear surface of the wheel 3, and is then bent at approximately a forty-five degree angle at a point indicated by the reference numeral 5. From the point or corner 5, the beam 4 extends rearwardly and laterally to a point substantially even with the inside face of the wheel 2. This rearwardly and laterally extending portion of the beam 4 is indicated by the reference numeral 6.

The implement frame further consists of a left hand side beam 7 which has a front horizontal portion 8 through which the axle 1 extends before receiving the wheel 2. The beam 7 has an upwardly and rearwardly extending portion 9 which extends beyond the rear surface of the wheel 2, to a corner 10. From the corner 10, the beam 7 is again bent into a horizontal plane along which it extends to a point lying at the rear and above the end of the portion 6 of the beam 4. This point or corner is indicated by the reference numeral 11. From the point 11, the beam 7 is bent downwardly and extends to a point 12 lying substantially even vertically with the lower surface of the portion 6 of the beam 4. From the point 12, the beam 7 is bent to extend horizontally forward to the end of the portion 6 of the beam 4, where it and the two beams are welded or otherwise rigidly connected at this point. The forwardly extending horizontal end portion of the beam 7 is indicated by the reference numeral 13, and to the nether surface of this portion there is pivotally connected the upper end of a pivot pin 14 which carries a usual caster-wheel 15 on its lower bifurcated end. The portion 6 of the beam 4 is provided with a rearwardly projecting bracket 16 which rotatably engages the upper end of another pivot pin (17) which supports a caster-wheel 18.

The implement frame further includes a horizontal cross-brace 19 which bridges the front ends of the two beams 4 and 7, and is attached thereto through the medium of arms 20 and 21 which each extend forwardly beyond the front ends of the beams 4 and 7 respectively. A sway-brace 22 is provided, and extends between the central portion of the cross-brace 19 and the right hand end portion of the portion 6 of the beam 4.

A rake supporting beam 23 has its right hand end rigidly bolted or otherwise connected to the right hand end portion of the cross-brace 19, and extends over the sway-brace 22 to a point substantially even with the left hand end of the portion 6 of the beam 4. The left hand end of the beam 23 lies above the left hand end of said portion 6, and is rigidly attached thereto by a vertical leg 24. The beam 23 is adapted to support a usual raking mechanism, not shown, but which is adapted to rake mown crops from the ground surface and discharge the raked crop in a windrow at the left hand end thereof.

A forwardly extending brace member 25 extends from the corner 10 of the beam 7 above the arm 21 in spaced relation thereto, and is held in such spaced relation by a support 26 and a bolt 27.

The rake frame thus formed is of rigid construction, and has no parts which move with relation to each other.

The front ends of the two arms 20 and 21 are each provided with two spaced vertically disposed pins 28, and slidably disposed between the two sets of pins, and extending horizontally, is a bridle-bar or rod 29 which is considerably greater in length than the distance between the two side beams 4 and 7.

A shackle 30 has one end pivoted to the left hand end of the bridle-bar 29, and its other end pivotally engages the forward end of a draw-bar or rod 31. The rear end portion of the rod 31 is telescoped into the front end portion of a tubular member 32 which has its rear end linked to the left hand portion of the rake supporting beam 23. A set-screw 33 acts to anchor the draw-bar 31 in various positions of longitudinal adjustability with relation to the member 32. The member 32 and draw-bar 31 combine to form a rigid link for connecting the left hand ends of the beam 23 and the bridle-bar 29 together.

An elongated tongue 34 extends forwardly over the rod 29 and has its rear end positioned against lateral movement with relation to the beam 23 by a telescoping link element composed of a rod 35 and a sleeve 35a. A yoke 36 is pivotally connected to the tongue 34, and slidably envelopes the rod 29 (Fig. 6). The tongue 34 extends forwardly beyond the rod 29, and its front end is equipped with a bifurcated yoke 37 whereby it may be attached to a loop 94 carried by the rear end of a tractor or other power vehicle 38.

The vehicle 38 may be of any conventional type capable of carrying a mower arm 39 whereby standing crop may be mowed.

In Fig. 1, the rake frame is depicted as travelling in a path lying to the right hand of the right hand wheel 80 of the vehicle 38, or in other words, in a path lying directly behind the mower mechanism 39. In Fig. 2, the rake frame is shown as travelling in a path in which the left hand end of the beam 23 projects to the left of the left hand wheel 81 of the vehicle 38. Since the beam 23 and the raking mechanism supported thereby is of a length sufficient to rake a path of mown crop almost twice as wide as the cut made by the mowing mechanism 39, mown crop may be delivered from the path behind the mower to a point lying substantially behind the left hand wheel of the vehicle when the rake is in the position shown in Fig. 1. When the rake is in the position shown in Fig. 2, it would be capable of picking up a winrow of mown crop from behind the left hand wheel of the vehicle 38, and delivering it off its left hand end in a winrow which would lie to the left of said wheel a distance substantially equal to the width of the swath originally cut by the mower 39.

In other words, by shifting the rake from the first to the second position, the width of the ground covered by the rake would be substantially equal to three times the width of the swath originally cut by the mower 39.

In order to carry out the method disclosed in my former patent mentioned hereinabove, it is necessary that a raking apparatus be provided which will cover this wide range of raking possibility.

It is obvious that in order to selectively position the raking mechanism in the two positions shown in Figs. 1 and 2 of the drawings, there must be some sort of a shifting and locking means provided. To this end the following described mechanism is provided.

Rigidly connected to the front end portion of the tongue 34, and spaced from each other, are two clamps 40 and 41. The clamps are identical. The clamp 40 consists of a metal loop 42 which surrounds the top, bottom and one side of the tongue, and a flat plate 43 through which the ends of the loop project, and which is tightened against the tongue by nuts threadedly positioned at the loop ends (Fig. 3). The clamp 41 is composed of a similar loop 92 and a plate 93.

Slidable along the tongue 34, and disposed thereon between the rear clamp 41 and the front clamp 40, there is provided a latch mechanism 44. The latch mechanism 44 is composed of a bent rod bracket having an elongated end portion 45 which frictionally engages one side of the tongue. The bracket is bent downwardly, as shown at 46, and is then bent horizontally beneath the tongue, and passes through a metal plate 47 vertically disposed on the other side of the tongue (Fig. 3). The horizontal portion of the bracket is indicated by the reference numeral 48. The upper end of the plate 47 is through perforated to receive a pivot pin 49 which is pressed tightly into the perforation, and which is held against rotation therein by a cotter-pin 50 passing through its end, and which also passes through the bracket end 48.

Fig. 3 shows the right hand end of the pivot pin 49, and the pin projects beyond the left hand face of the plate 47, and this projecting end passes through the lower end of a pivotally mounted lever arm 51. The lower end of the arm 51 is welded to the right hand face of a latch element 52 having two upwardly and outwardly extending latch hooks 53 and 54. The latch element 52 lies above the tongue 34, and the hook 53 is adapted to be engaged over the loop 42 of the clamp 40 when the latch mechanism 44 is slid along the tongue 34 to the forward end of its permitted travel, and when the upper end of the lever arm 51 is swung forwardly (Fig. 3). Similarly, when the latch mechanism is slid rearwardly along the tongue 34 to the dotted line position of Fig. 3, the hook 54 may be latched over the loop 92 of the clamp 41 by swinging the upper end of the lever arm 51 in a rearward direction. A coil spring 55 has its lower end attached to the bracket end 48, and its other end is connected to the lever arm 51 by a pin 56. The spring arrangement is such that the lever arm 51 is held off center in either a forward or rearward position.

Pivotally connected to the left hand face of the latch element 52 by a wobbler connection 57, is the front end of a rod 58. The rod 58 extends rearwardly toward the shackle 30, and its rear end portion is telescopically received in the forward end of a tubular member 59. A set screw 61 acts to hold the rod 58 in various positions of longitudinal adjustment with relation to the tubular member 59. The rear end of the member 59 is pivotally connected to the shackle 30 by a suitable fitting 60 (Fig. 5).

Rigidly welded to the front clamp 40 on the tongue 34, is the lower end portion 62 of an upright metal standard 63. The standard 63 has a horizontally extending portion 64 which lies above the tongue 34 and which is parallel thereto (Fig. 3). The horizontal portion 64 of the standard 63 extends rearwardly, and terminates above a point lying substantially half way between the two clamps 40 and 41 on the tongue 34. The extreme rear end of the portion 64 is equipped with two spaced sheaves 65 and 66, and a cable 67 has one end attached in a perforation 68 in the upper end of the lever arm 51. The cable 67 is threaded between the two sheaves 65 and 66, and its other end extends forwardly to the vehicle 38 where it may be manually pulled to actuate the lever arm.

It may be seen that when the latch mechanism 44 is at the forward end of its travel, and when the upper end of the lever arm 51 is also in its forward position, as shown in solid lines in Fig. 3, and as depicted in Fig. 1, the latch hook 53 will be hooked over the loop 42 of the clamp 40. With this condition existing, the rod 29 of the rake mechanism will be moved horizontally to the left hand end of its throw, and therefore the wheels 2 and 3 will be forced to travel behind the mower 39, as depicted in Fig. 1.

Should the forward end of the cable 67 then be pulled, it would exert a rearward force upon the upper end of the lever arm 51 due to the fact that the lever arm is lying ahead of the sheave 65. Such rearward movement of the lever arm will unlatch the hook 53 from the clamp 40. Such a release of the latch hook 53 will permit forward movement of the vehicle 38 to align the tongue 34 directly behind its point of connection to the vehicle, as shown in Fig. 2. Such lateral shifting of the tongue will cause movement of the rod 29 to the right hand end of its travel, and in shifting, the member 59 and rod 58 will pull the latching mechanism 44 rearwardly along the tongue 34.

During such rearward movement of the latch mechanism, the rear hook 54 will be sliding along the upper surface of the tongue, and when it reaches the loop 92 of the rear clamp 41, it will engage the same, as shown in dotted lines in Fig. 3. The rake mechanism will then be forced to travel behind the left hand wheel of the vehicle 38, in other words, in the position shown in Fig. 2.

Should it be found desirable to again place the rake mechanism in a position to rake behind the mower 39, the forward end of the cable 67 will again be manually pulled to release the latch hook 54, and at the same time, the vehicle 38 will be backed toward the rake. Rearward movement of the vehicle 38 will force the tongue 34 rearwardly until the hook 53 again engages the clamp 40.

It is pointed out that the telescopic adjustments permitted by the set screws 33 and 61 permits a selected variation in permitted lateral shifting of the rake. Also that selective shifting of the clamps 40 and 41 with relation to the tongue, 34 may accordingly be made.

Apparently, the draft mechanism above described may well be used for attaching tool-carrying vehicles other than field rakes.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A draft mechanism for a wheeled implement frame, including: a transversely extending bridle-bar carried by the frame for lateral sliding movement with relation thereto; an elongated tongue extending across the bridle-bar and pivotally attached intermediate its own ends to the medial portion of said bar, said tongue having its forward end pivotally connected to a draft vehicle, and having its rearwardly extending end coupled to the frame; a link rigidly connecting the frame and one end of the bridle-bar; and means mounted on the tongue for selectively moving said end of said bridle-bar toward and away from the forward portion of the tongue.

2. Structure as specified in claim 1, in which the link is selectively adjustable in length.

3. Structure as specified in claim 1, in which the swinging means is selectively adjustable as to sweep.

4. Structure as specified in claim 1, in which said means includes: a second link having its rear end pivotally connected to said end of said bridle-bar, and having its front end slidably connected to the front end of said tongue; and means for anchoring the link to the tongue in more than one position.

ROBERT FLOYD ADKISSON.

REFERENCES CITED

The following references are of record in the file of this patent:

UNITED STATES PATENTS

| Number | Name | Date |
|---|---|---|
| 1,049,082 | Hansmann | Dec. 31, 1912 |
| 1,408,672 | Wills | Mar. 7, 1922 |
| 1,429,729 | Gerdeman | Sept. 19, 1922 |
| 1,553,570 | Strandlund | Sept. 15, 1925 |
| 1,974,410 | Caughey | Sept. 25, 1934 |
| 2,311,859 | Oehler | Feb. 23, 1943 |